Jan. 9, 1945.  E. AULIN  2,366,995
STABILIZING ARRANGEMENT FOR CONTROL PENDULUMS
Filed July 30, 1941
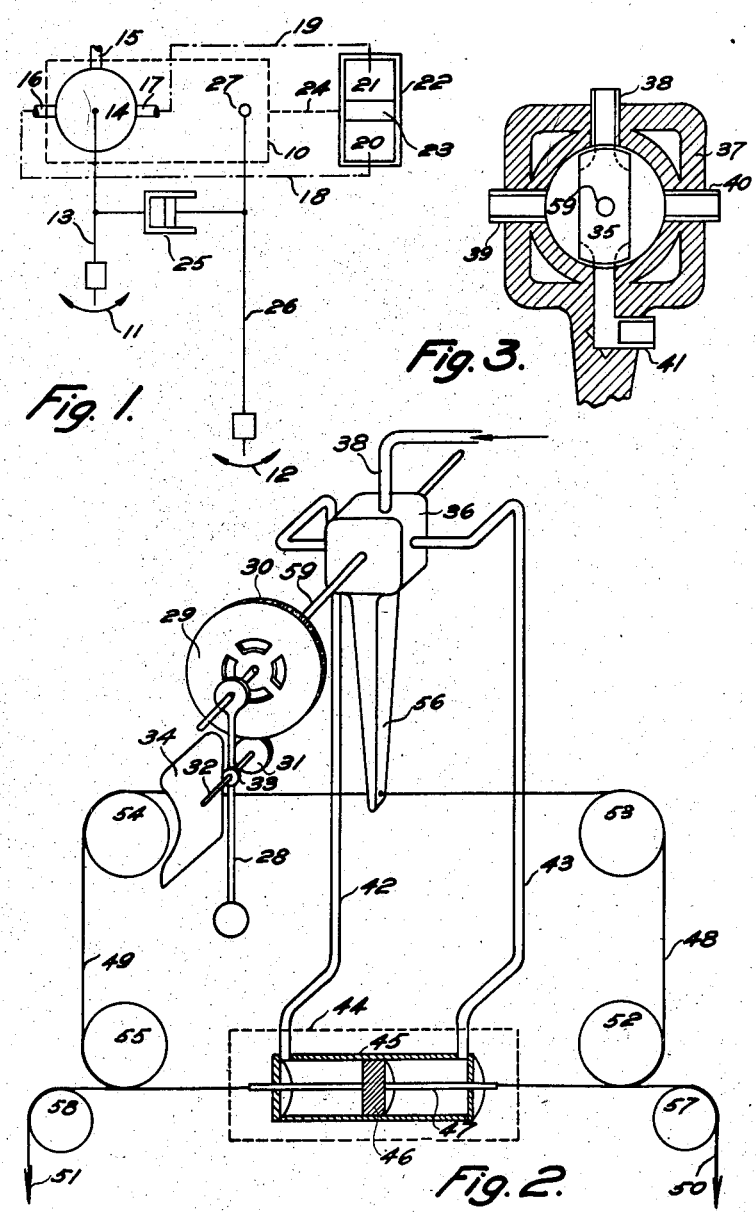
INVENTOR.
Evert Aulin
BY
his ATTORNEY Patented Jan. 9, 1945

2,366,995

UNITED STATES PATENT OFFICE 2,366,995

STABILIZING ARRANGEMENT FOR CONTROL PENDULUMS

Evert Aulin, Lidingo, Sweden, assignor to Aga-Baltic Aktiebolag, Stockholm, Sweden, a corporation of Sweden Application July 30, 1941, Serial No. 404,669
In Sweden September 30, 1940

5 Claims. (Cl. 244—80)

My invention relates to stabilizing arrangement for control pendulums.

In automatic stabilizing arrangements for instance for airplanes or for military pieces placed on a movable base, it has been proposed to use pendulums as indicators for the directions of force, during special conditions corresponding to the vertical position or the vertical direction. Trials of such devices, however, have not been successful, and for this reason much more complicated and unsensitive arrangements employing a gyroscope have been used instead of a pendulum. Gyroscope arrangements are more expensive than pendulum arrangements, and they are also more sensitive to errors, as a possibly wrong starting position of the gyroscope may be sustained and thus cause a wrong normal position for the control operation.

Earlier attempts to use pendulums as indicators failed due to the matter of fact that it was not possible to damp the pendulum oscillations to a sufficient degree. As damping means there has as a rule been used an oil cataract, an air cataract or the like, provided between the pendulum as a control means and the controlled means, for instance the body of an airplane. In the following the disadvantages with the pendulum constructions, hitherto used, and the advantages with the pendulum construction according to the present invention will be described in connection with an airplane, as the invention has specially great advantages for stabilizing of airplanes.

One of the movements it is desired to stabilize, is the so called rolling movement, that is a rotating or oscillating movement about the longitudinal axis of the airplane. In the earlier known arrangements using a pendulum as stabilizing means the pendulum tends to remain in a vertical direction, but due to the damped connection between the pendulum and the airplane, the movement of the pendulum is prevented from taking place instantaneously. In this way it was intended to gain the advantage that force for correction of the rolling movement of the airplane, from the valve means or the like controlled by the pendulum, should be supplied during a sufficiently long time. However, this results, on the other hand, that the damping force is supplied to the pendulum from the body of the airplane, whereas the pendulum by means of valve arrangements or the like supplies force to the body of the airplane. A circulation of energy thus takes place, which will very easy result in a creation of oscillations instead of a damping of oscillations. In order that no such creation of oscillations shall take place, it is obviously necessary that the above mentioned circulation of energy be prevented. It was for that reason, that pendulums were replaced by gyroscopes as stabilizing means, the gyroscopes not requiring damping, as it is characteristic of a gyroscope to maintain itself in a fixed direction.

In the arrangement according to the present invention a pendulum is used as stabilizing means, but contrary to the earlier proposed arrangements, the pendulum is not damped with respect to the stabilized object but by another, freely mounted object. Of course, this second freely mounted object may be regarded as a second pendulum, and regarded in this manner the second object should have an oscillating period, which is substantially different from the oscillating period of the stabilizing pendulum, and preferably it should be interminably long.

Further objects and advantages of my invention will be apparent from the following descriptions considered in connection with the accompanying drawing, on which:

Fig. 1 is a diagrammatical view showing the principle of my invention;

Fig. 2 is a view partially in perspective and partially in cross-section showing apparatus embodying my invention; and Fig. 3 is a cross-sectional view on a larger scale from a portion of the device illustrated in Fig. 2.

In Fig. 1 the rectangle 10 shown in dotted lines represents a body which is to be stabilized against movements in the direction of the arrows 11 or 12. The body may for instance be an airplane, and the arrows 11 and 12 in such case represent the direction of rolling movements. The pendulum, causing the stabilization, is denominated 13. For causing stabilizing movements the pendulum 13 is connected to a relay 14, which may for instance be mechanical, hydrodynamic or aerodynamic, and which is in the present case assumed to be an air-pressure-valve. The air under pressure is supplied by the pipe 15 and is divided by the movements of the valve between the pipes 16 and 17, which are connected by conduits 18 and 19, respectively, to chambers 20 and 21, respectively, in a cylinder 22. The chambers 20 and 21 are separated by means of a plunger 23, which is indicated by the dotted lines 24, as mechanically influencing the stabilized body 10, so that its oscillating movements are decreased or eliminated.

The oscillations of the pendulum 13 are damped by means of a cataract arrangement 25, which is, in accordance with the invention connected with a second body 26, which is schematically shown as a pendulum. This body is mounted for free oscillation with respect to the stabilized body 10, as by means of a pivot 27.

The pendulums 13 and 26 have substantially different oscillating periods. Preferably the pendulum 13 has a substantially shorter oscillating period than the relatively long pendulum 26. The pendulum 13 thus functions as a stabilizing pendulum, whereas the pendulum 26 functions as a damping pendulum.

The arrangement shown in Fig. 1 operates in the following manner: If the stabilized body 10, which may for instance be an airplane, tends to roll both the pendulums 13 and 26 will oscillate about their respective pivots. However, the longer oscillating period of the pendulum 26 results in a damping force being exerted through the cataract 25 on the pendulum 13, whereby the tendency of over-oscillation of the pendulum 13 is avoided. The transmission of force through the device 25, is accompanied by the consumption of energy required to compress the air which is trapped between the piston and cylinder of this device. The movement of the pendulum 13 is transferred to the relay arrangement 14, which, as mentioned above, may be an air pressure valve. Due to the operation of the valve 14, air under pressure will be fed from the pipe 15, which is in connection with a compressor, to one of the pipes 16 or 17, whereas the other pipe is put in connection with the atmosphere in a manner which is known per se. There is thus caused a displacement of the plunger 23 in the cylinder 22, and due to the mechanical power transmission 24, which may be connected to the rudders on the airplane body 10, the airplane and hence the valve housing 14 will be returned to the same position in relation to the pendulum 13, as shown in Fig. 1.

Fig. 2 shows the principal parts of a practical embodiment of the invention. The main control shaft is in the arrangement according to Fig. 2 denominated 59. On this shaft the stabilizing pendulum 28 is rigidly fixed. As damping device there is employed a wheel 29, which is freely turnable on the shaft 50. This wheel has substantial mass and, if the mass is eccentrically distributed, the wheel acts as a pendulum. The wheel 29 is provided with gear teeth 30, which mesh with a pinion 31. The pinion 31 is rigidly fixed to a shaft 32, which is journaled at 33 in the pendulum 28. An air damping arrangement is secured to shaft 32, preferably in the form of a pair of wings 34.

The shaft 59 is rigidly connected to the rotor 35 of a valve 36, the stator of which is denominated 37. The valve is formed with four ports 38, 39, 40, and 41. Port 38 is connected to a suitable source of compressed air, such as a compressor. Ports 39 and 40 are connected by means of conduits 42 and 43, respectively, with opposite ends of a control cylinder 45. Port 41 opens to the atmosphere. The rotor 35 in the valve 36 is so arranged that the ports 38 and 41 are covered in its position of rest. Small displacements of the rotor 35 in relation to the stator 37, however, result in establishing communication between the ports 38 and 40 and also 39 and 41, or 38 and 39 and also 40 and 41.

Possibly the rotor part 35 may be so arranged, that a very weak air current is flowing through the pipe 38, said air current in such case automatically being equally divided on the pipes 39 and 40.

From the ports 39 and 40 conduits 42 and 43 lead to the servo-motor 44, which is assumed in this case to be a cylinder 45, containing a displaceable plunger 46, mounted on a piston rod 47, which extends out on both sides from the end walls of the servo-motor. To each end of the shaft 47 two wires are fixed, namely the wires 48 and 49 and also the wires 50 and 51. The wires 48 and 49 run over the pulleys 52, 53, 54 and 55 to a lever 56, which is rigidly connected to the stator 37 of the valve 36. The wires 50 and 51 run over pulleys 57 and 58 to the rudder of the airplane.

The devices operate in the following manner:

At the beginning of a rolling movement of the airplane the valve 35—56, which is connected with the rudder of the airplane, will follow the movement of the airplane, whereas the pendulum 28 tends to remain in a vertical position. Also, if the mass of the wheel 29 is eccentrically distributed, the wheel tends to turn about the shaft 59 so as to maintain its center of gravity vertically below the shaft, inasmuch as it is a pendulum. An exception to the above is in the case that the airplane is simultaneously making a curve, whereby centrifugal forces also occur. In this case the pendulums 28 and 29 will tend to take positions determined by the resultant direction of the gravitational and the centrifugal forces. However, this is advantageous, as the wingplane of the airplane should be perpendicular to this resultant direction for obtaining the best possibility of control.

However, the rotor of the valve 36 is connected to the pendulum 28 by the shaft 59, and as a consequence thereof a displacement will take place between the rotor 35 and the stator 37 in the valve 36. Air thereby is fed from the compressor to one of the sides of the piston 46 in servo-motor 44, whereas air from the other side is conducted to the atmosphere. As a consequence, the piston 46 is moved causing similar movement of the wires 48 and 49 and hence also of the stator of the valve, until the air input is again restricted. Simultaneously, however, also the wires 50 and 51 are displaced, whereby a movement of the rudder of the airplane is obtained, compensating the rolling movement. It is now assumed, that for some reason an oscillating movement occurs, so that the pendulum 28 oscillates periodically. However, the pendulum 28 tends to oscillate with a frequency which is substantially different from the frequency of the pendulum wheel 29. Due to the difference of oscillating frequency and the difference in speed of movement, resulting therefrom, the pinion 31 will rotate in mesh with the teeth 30 of the pendulum wheel 29, and consequently the air wings 34 will rotate. The energy consumed hereby will immediately stop the tendency of oscillation of the pendulum 28, so that this pendulum as well as the pendulum 29 will remain aperiodic and very rapidly revert to their position of rest, determined by present forces.

If the mass of wheel 29 is concentrically distributed, it will not tend to oscillate as the ship rolls, but its inertia will nevertheless tend to dampen the oscillations of pendulum 28, inasmuch as the swinging of the pendulum causes pinion 31 to rotate around wheel 29, thus causing rotation of the air vanes 34.

Of course the invention is not limited to the shown and described form of execution, but substantial modifications thereof may be made without coming outwards the frame of the invention.

What is claimed is:

1. In a device for stabilizing an object, a pendulum pivotally connected to said object, means responsive to movement of the pendulum relative to said object for exerting a stabilizing force on the object, a member having substantial mass turnably connected to said object, and structure connecting said pendulum to said member, said structure being provided with damping means independent of said object which consumes energy upon a change in the position of said pendulum relative to said member.

2. In a device for stabilizing an object, a pendulum pivotally connected to said object, means responsive to movement of the pendulum relative to said object for exerting a stabilizing force on the object, a second pendulum pivotally connected to said object, and structure connecting said pendulums to each other, said structure being provided with damping means independent of said object which consumes energy upon a change in the position of one pendulum with respect to the other.

3. In a device for stabilizing an object, a pendulum pivotally connected to said object, means responsive to movement of the pendulum relative to said object for exerting a stabilizing force on the object, a second pendulum pivotally connected to said object and having a lower frequency of oscillation than the first-mentioned pendulum, and structure connecting said pendulums to each other, said structure being provided with damping means independent of said object which consumes energy upon a change in the position of one pendulum with respect to the other.

4. In a device for stabilizing an object, a pendulum pivotally connected to said object, means responsive to movement of the pendulum relative to said object for exerting a stabilizing force on the object, an unbalanced wheel turnably mounted on said object, and structure connecting said pendulum to said wheel, said structure being provided with damping means independent of said object which consumes energy upon a change in the position of said pendulum relative to said wheel.

5. In a device for stabilizing an object, a pendulum pivotally connected to said object, means responsive to movement of the pendulum relative to said object for exerting a stabilizing force on the object, an unbalanced gear wheel turnably mounted on said object, a shaft journaled in said pendulum, a pinion mounted on said shaft and meshing with said gear wheel, and air damping vanes mounted on said shaft, whereby a change in position of said pendulum with respect to said wheel causes rotation of said vanes, which consumes energy.

EVERT AULIN.